June 29, 1965  M. VANZO  3,191,229
APPARATUS FOR THE CONTINUOUS MIXING OF PLASTIC MATERIAL
Filed July 13, 1962  2 Sheets-Sheet 1

INVENTOR
Marcello Vanzo

BY
Stevens, Davis, Miller & Mosher
ATTORNEYS

INVENTOR
Marcello Vanzo

United States Patent Office 3,191,229
Patented June 29, 1965

3,191,229
APPARATUS FOR THE CONTINUOUS MIXING
OF PLASTIC MATERIAL
Marcello Vanzo, Milan, Italy, assignor to
Pirelli S.p.A., Milan, Italy
Filed July 13, 1962, Ser. No. 209,618
Claims priority, application Italy, July 19, 1961,
13,278/61
9 Claims. (Cl. 18—12)

This invention relates to mixable material and pertains as more particularly stated to an improved apparatus, as experience has shown, which lends itself to uninterrupted mixing of plastic materials, such as rubber, for example.

Briefly, and from the standpoint of the mixing and dispensing apparatus, this apparatus is characterized by a hopper-equipped receiver which is structurally and functoinally novel in that it embodys a hollow truncated conical housing or receiver which encloses a lengthwise rotatable, power driven, material mixing screw so as to define, between the addendum envelope of the screw and the inner surface of the cavity in which the screw is eccentrically mounted, a generally annular chamber, of a height, radially measured with respect to the screw, which varies in each section normal to the axis of the screw from a minimum value to a maximum value and then again to a minimum value. The screw decreases in cross section from the larger hopper-equipped end to the smaller discharge end and its threads define a helical channel having progressively decreasing cross section. The chamber constitutes a reservoir which functions to trap the overflow material from the helical channel, owing to the decreasing of its cross section. The overflow material, which continues to maintain contact with the stream of material in the spiralling channel of the screw, is again drawn into rotation in subsequent layers and forced to reenter between the threads of the screw and is consequently mixed with the material advancing in the channel upstream of the position of the flowing material from which it was separated.

Heretofore, in mixing plastic materials including rubber, various types of mixers having a hollow body, containing two rotating blades with parallel axes, have been utilized. The material to be mixed is supplied from a hopper into the machine at prescribed intervals and is directed by a relatively large pneumatic cylinder against the two rotating blades. The blades are so shaped as to continuously laminate and stir the material which, when the mixing has reached the desired state, is discharged through a suitable port which, during the mixing operation, is closed by a resistant door. The results obtained with machines of this kind are satisfactory for the mixing operation itself, but the supply and the discharge of the material are intermittent, so that they do not carry out a continuous process.

The operation of the apparatus results in causing all the material to advance into a frusto-conical cavity from the end of greater diameter to the end of smaller diameter, in a progressively decreasing amount along a helical channel, in discharging from said channel a part of the material to introduce it into a surrounding chamber directly accessible from the channel, and in causing the material discharged from the helical channel to reenter said channel to join with the material advancing in said channel upstream of the material from which it has been separated.

The chamber into which the material discharging or overflowing from the helical channel is deposited has such a shape that in any transverse section its height, radially meausred with respect to the helical path, varies circumferentially from a minimum value to a maximum value. Therefore the material advancing in said helical channel, at each complete convolution, passes at least once from a position in which the chamber is of a minimum height to a position in which the chamber is of a maximum height and then back to the position in which the chamber is of a minimum height. The discharge of the material from the channel to the chamber takes place in an increasing amount from the position in which the chamber is of a minimum height to the position in which the chamber is of a maximum height. From the latter position the material which has been deposited in the chamber and is still in contact with the material advancing along the channel, is again drawn into motion and reenters the channel in subsequent layers gradually with the decrease of the chamber's height until it is entirely redeposited into the channel in the position in which the height of the chamber is minimum. By reentering the helical channel the material does not join with the material from which it has been separated, but rather with that advancing in the same channel upstream of it.

The mixing of the material advancing in the channel is enhanced the more times it is discharged from the channel into the surrounding chamber and is redeposited in the channel. In order to make this mixing ratio as great as possible, the amount of material advancing along the channel decreases by flowing from the feeding end to the discharge end.

In some cases, in which it is desired to incorporate powdered material into a plastic mass, the material, before reentering the helical channel, is subjected to a strong laminating action by increasing the area of the zone in which the chamber is of a minimum height, both in the direction parallel to the channel into which the material is advancing and in the direction parallel to the axis about which the channel winds.

A further object of the invention is a mixer, which consists of a substantially hollow body or receiver having a generally frusto-conical cavity disposed between an inlet opening and a discharge opening of the receiver. At the end of the cavity having a larger diameter there is the opening for the supply of the material to be mixed and at the end having a smaller diameter there is the second opening for the discharge of the mixed material. Inside the receiver there is rotatably mounted a frusto-conical feed screw, whose larger diameter is disposed in the intake end and whose threads constitute a helical channel of a decreasing depth from the intake end to the outlet end. The position of the feed screw in the receiver is such as to leave between the envelope surface thereof and the inner surface of the cavity in which it rotates a surrounding chamber of a height, in each section normal to the axis of the screw, and radially measured with respect to the screw itself, varying from a minimum value to a maximum value.

The mixer forming the subject matter of the present invention permits continuous or non-intermittent mixing of plastic material, for which the above described prior art devices are used, by receiving in a continuous manner the material to be mixed and by discharging, also in a continuous manner, the mixed material.

It also permits the continuous mixing of rubber or of other plastic material together with powdered or liquid material, or of any other material or composition provided that these materials, alone or in combination, have such a consistency as to be conveyed by means of a screw from the hopper into which they are fed to the discharge outlet of the machine.

The continuous mixer can also be used to mix a single material in order to increase its plasticity or to improve the dispersion of the ingredients therein incorporated and also to eliminate air occlusions due to the prior operations.

These and other features of the method and of the machine forming the subject matter of the present invention will be more clearly apparent from the following description, made with reference to the attached drawings which illustrate, by way of non-limiting example, a preferred embodiment of the invention itself.

Figure 1:
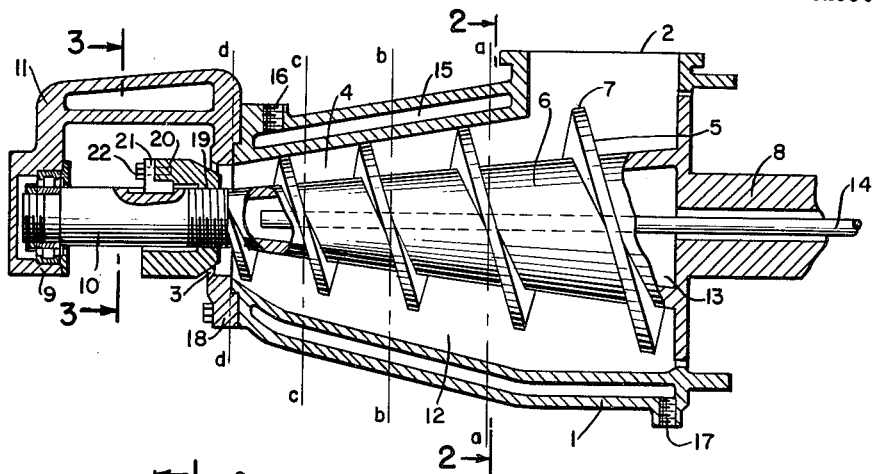
FIGURE 1 is a central longitudinal section with parts broken away and other parts appearing in section of a continuous type mixer on the section line 1—1 of FIGURE 2.
Figure 2:
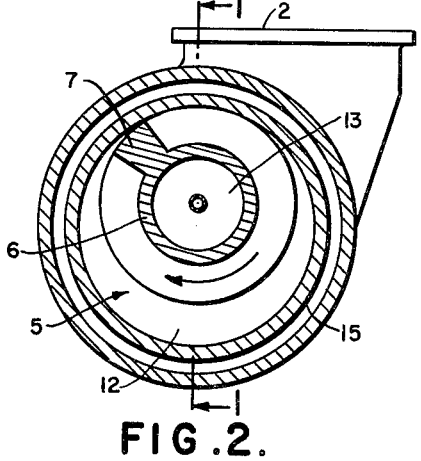
FIGURE 2 is a cross section taken on the line 2—2 of FIGURE 1.

The device illustrated in FIGURES 1 and 2 has a frusto-conical body or receiver 1 into which the material to be mixed is supplied at the end of greater diameter through a hopper 2 and from which the mixed material is discharged at the end of small diameter, through discharge outlet 3.

Inside the receiver 1 there is a frusto-conical cavity 4 containing a rotatable feed screw, also of frusto-conical shape, which extends the length of the receiver and is disposed eccentrically with respect to the cavity.

The frusto-conical screw 5 comprises a frusto-conical hollow core 6 about which the thread 7 is wound. The pitch of the thread, its height in the direction normal to the axis of rotation of the screw, and the conicity of the core are provided in such a way that the volume of the channel comprised between two adjacent coils of the thread progressively decreases from the end of greater diameter to the end of smaller diameter.

The screw, at the end of greater diameter, is sustained by a supporting and thrust bearing, not shown in the figure, which is similar to those used for the screw of the conventional extruders, and is assembled on the shaft 8. This screw, at the end of smaller diameter, is supported by bearing 9 assembled on the shaft 10 and supported by an overhanging arm 11, integral with the receiver 1. The screw 5 is rotated by means of a motor-speed reducer not shown in the figure, which is connected with the extremity of the shaft 8.

The conicity of the cavity 4, is greater than the conicity of the frusto-conical addendum envelope of the screw 5 for throughout at least a portion of the length of the receiver, and the the axis of rotation of said screw forms with the axis of symmetry of the cavity 4 such an angle that a generatrix of the addendum envelope of the screw, during the rotation of the latter, nearly meets with a generatrix of the cavity 4. In the position diametrally opposite to the one where the two generatrices nearly meet each other, the two generatrices of the same surfaces are spaced apart a distance which approximately corresponds to twice the difference between their respective concavities. It follows that between the inner surface of the chamber 4 and the addendum envelope of the screw 5 there is a material accumulating chamber or reservoir, indicated by the reference numeral 12 in FIGURES 1 and 2, the sections of which, in planes at right angles to the axis of rotation of the screw, are limited by two circumferences tangential at one point with each other. The diameter of these circumferences and therefore the area of the chamber limited by them progressively decreases from the intake end towards the discharge end.

Inside the core 6 there is a cavity 13 into which, through a tube 14, steam or water can be injected to heat or cool the screw until it reaches the most suitable temperature for the mixing operation. The circulation of water or steam in the cavity is ensured by the tubular discharging duct disposed between the tube 14 and the bore of the shaft 8.

In order to heat or cool the body 1 there is provided a jacket 15 into which the steam or the water can be injected through the inlet 16 and can be discharged through the plug 17.

The extremity of the body 1, at the discharge end, carries a flange 18, constituting a part of the arm 11, at the center of which flange there is a port of a diameter equal to the smaller diameter of the cavity 4. The shaft 10 has a thread 19 onto which is assembled a collar or collet 20 terminating at its end adjacent the flange 18 in a chamfered surface adapted to close the port in the flange. By manipulating the sleeve 20 on the thread 19 it is possible to enlarge or reduce the annular discharge outlet 3. When the desired discharge outlet is reached, the sleeve 20 can be integrated with the shaft 10 by means of the key 21 held in place on the sleeve 20 by clamping screw 22.

Figure 3:
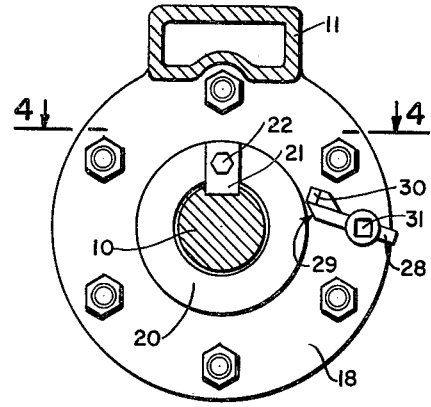
FIGURE 3 is a section on the vertical line 3—3 of FIGURE 1.
Figure 4:
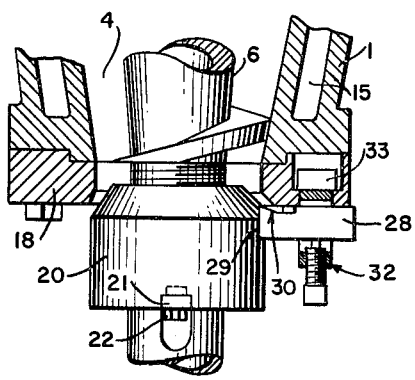
FIGURE 4 is a fragmentary view on the horizontal line 4—4 of FIGURE 3, with parts in elevation and parts in section.

When the continuous mixer is operative, the mixed material is discharged in the form of a tube drawn into rotation by the sleeve 20 between the conical end of the sleeve 20 and the port in the flange 18. In order to collect this material, the tube must be cut and removed from the shaft 10 and this can be accomplished for instance by a cutter device like that represented in FIGURES 3 and 4, which consists in a blade 28 terminating with two cutting edges, one parallel to the sleeve 20, indicated by reference numeral 29 and one practically at right angles to it, indicated by reference numeral 30. The blade 28 is kept stationary against the flange 18 by means of a screw 31 screwed in the support 32, which is assembled into a hole suitably provided on said flange 18, and opposes to the draw of the screw 31 by means of the head 33. The cutting edge 30 cuts the tube of discharged material into a continuous strip helically unwinding, which is detached from the sleeve 20 by means of the cutting edge 29.

In order to illustrate the operation of the above described mixer, it is assumed that it is sectioned along planes normal to the axis of rotation of the screw throughout the length of the portion of the receiver 1 disposed between the hopper 2 and the discharge outlet 3. Said planes are indicated in FIGURE 1 with the reference letters a—a, b—b, c—c, d—d.

When the screw 5 is driven into rotation, the thread helically wound about the central core tends to force against the discharge outlet the material flowing from the feeding end. Since, as said above, the volume of the material contained between the progressively decreasing pitches of said thread rapidly decreases from the feeding end to the discharge end, the amount of material conveyed downstream by the the portion of the screw disposed between the planes a—a and b—b is greater than the amount of material conveyed downstream by the portion of the screw disposed between the planes b—b and c—c and likewise for all the subsequent portions down to the discharge outlet.

The amount of material in excess of the capacity of one of said portions and the capacity of the next portion cannot move towards the discharge outlet and must therefore pay out into the chamber 12.

The paying out of the material rotating between the threads of the screw to the chamber 12, if it is considered in a plane normal to the axis of rotation of the screw and in the direction of rotation of the screw itself, occurs immediately after the position where the height of the chamber, radially measured with respect to the screw, is minimum, and progressively increases with the increase of the height of said chamber until it reaches a maximum in the position where the height of the chamber is the greatest.

The material passed into the chamber 12, being in contact with the screw and with the material rotating with it, is gradually and in subsequent layers again drawn into rotation and, since the height of the chamber 12 after having reached the maximum dimension tends to decrease, the material drawn into rotation is forced to find its way between the threads of the screw, and its injection is progressively increasing with the decrease of the height of the chamber 12 until all the material is completely mixed—in the position where the height of the chamber 12 is the lowest—with the material advancing between the threads of the screw towards the discharge outlet.

From the above it clearly appears that the operation of the continuous mixer forming the subject matter of the present invention, although it is based on a screw which conveys the material through a hollow body from the feeding end to the outlet end, is substantially different from the operation of the extruders conventionally used for the following reasons:

(a) In conventional extruders the pressure of the material advancing towards the outlet end is minimum at the feeding end and linearly increases until it reaches a maximum in the zone adjacent the extruding die. In the continuous mixer the pressure of the material advancing towards the outlet end is minimum at the feeding end portion, increases to a maximum towards the central zone of the body and then decreases again to a minimum, which can also be negative, in the zone adjacent the outlet end.

(b) In the conventional extruders the material passes without any difficulty from one element to the other, because the capacity of the subsequent elements is substantially equal, and therefore each element, operating in series with the others, contributes to increase the rate of the pressure of the material advancing towards the discharge outlet. The rate reached by the pressure in the zone adjacent the discharge outlet is greater the smaller the size of the discharge outlet; that is, greater difficulty is encountered by the material extruding from the discharge outlet. In the continuous mixer the rate of the pressure of the material advancing towards the discharge is higher the greater the capacity difference between the subsequent elements of the screw; that is, greater difficulty is encountered by the material flowing from one element to the other. However, even if the discharge outlet is reduced, to a substantial degree, rates having the same magnitude as those obtained in the conventional extruders are never reached, because the material which cannot flow out from the outlet end can return towards the feeding end through the chamber 12.

(c) In the conventional extruders it is necessary to minimize the clearance between the screw and the inner surface of the cavity into which it rotates in order to minimize the loss flow, commonly called "leakage flow" by those skilled in the art, which, due to the high pressure reached in the zone before the discharge outlet, returns towards the feeding end by passing through the screw and the cavity in which it rotates. In the continuous mixer the clearance between the screw and the inner cavity in which it rotates is substantial to maintain a high leakage flow. Consequently the pressure of the material advancing towards the discharge outlet can never reach a rate of an order of magnitude like that obtained in the conventional extruders.

(d) As the leakage flow is proportional to the pressure of the material, in the conventional extruders it is maximum at the discharge end and minimum at the feeding end, whereas in the continuous mixer it is maximum in the central portion of the screw and minimum at its two extremities.

(e) In the conventional extruders the high pressure which occurs in the zone adjacent the die causes a remarkable flow of material, in a direction opposite to the forward motion, in the zone which is the nearest to the core of the channel limited by two subsequent coils of the thread. This flow is called "pressure flow" by technicians in the art. In the continuous mixer, the pressure of the material is moderate on account of the large size of the chamber 12 and therefore the pressure flow is practically negligible.

(f) In conventional extruders the leakage flow causes the material to advance in a direction opposite to the forward motion. In the continuous mixer the material passing from the screw to enter the chamber 12 is again drawn into rotation and is redeposited between the threads of the screw itself.

(g) In the conventional extruders the leakage flow occurs uniformly all around the screw, whereas in the continuous mixer it is concentrated in one portion thereof. Therefore the continuous mixer can be considered as an extruder in which the motive power is used to mix the material and not to compress it.

As the difference of capacity between the coils of the channel having a greater diameter adjacent the feeding end, and the coils having a smaller diameter adjacent the discharge end, is substantial, the amount of the material discharged from the outlet is small in comparison with the amount of material which is mixed inside the mixer in the same period of time. Consequently the material entering from the feeding end flows from the discharge end after having carried out the above described mixing cycle several times, and this mixing becomes more efficient the greater the number of times the material is compelled to carry out the cycle. In other words, the greater the difference of capacity between the subsequent coils of the thread which convey the material from the feeding end to the outlet end, the less material enters from the feeding end or flows from the outlet end in comparison with the amount of material which is mixed inside the mixer in the same period of time, and the greater is the ratio between the amount of material which passes into the chamber and the amount of material which returns towards the feeding end in the from of "pressure flow."

The efficiency of the mixing to which the material passing from the feeding end to the outlet end is subjected can therefore be increased:

(a) On an already working mixer by moving the sleeve 20 towards the port provided in the central part of the flange 18, and thus reducing the outlet 3 through which the mixed material is discharged, or (b) during the design of the machine:
   (1) by increasing the conicity of the screw or the pitch of the coils or their height;
   (2) by increasing the length of the screw;
   (3) by increasing the transverse dimensions of the chamber 12 with respect to the transverse dimensions of the screw 5.

In modifying the geometrical shape of the screw 5 it is of course necessary to bear in mind that, as it is known to those skilled in the art, in order to obtain in the practice good performance of the screw, some rules are to be followed, including the provision of a certain ratio between the pitch and the height of the thread helically wound about the central core.

For this practical reason it is not possible to reduce the conicity of the screw below certain values and still maintain the required ratio between the capacity of the cooperating elements, because the pitch of the thread wound about the core would be increased in such a way as to obtain an inclination of the thread with respect to the axis of rotation of the screw which would cause the material to simply rotate instead of advancing towards the outlet end. Also the dimensions of the chamber 12 cannot be increased over a certain limit, as otherwise the overflowing material would encounter difficulty in returning between the coils, since it cannot be pressed against the screw in a measure sufficient to be drawn again into rotation. These dimensions, on the other hand, cannot be reduced below a certain limit; first of all because, owing to the wide difference of capacity between the subsequent elements of the screw, the material would return towards the feeding end, between the screw threads, in such an amount as to contrast the motion of the material advancing between the same threads towards the discharge end; and secondly, because the greater is the amount of material returning towards the feeding end between the threads of the screw in comparison with the amount of material overflowing into the chamber 12, the smaller is the mixing of the material flowing from the discharge end.

The chamber 12, surrounding the screw 5, must have a variable height, not only to force the overflow material to reenter between the threads of the screw, but also because if it were of a constant height, the large layer of material which would accumulate in the chamber about the screw would tend to rotate together with the latter, at least in the nearest layers and the material existing between the threads could no longer advance towards the discharge end.

However, the fact that the chamber 12 in each of its sections in planes normal to the axis of rotation of the screw is limited by the two circumferences having a different diameter and tangent with respect to each other at one point must be considered as indicative and not limitative.

The cavity 4 provided inside the body or receiver 1, which hereinbefore has been described as frusto-conical, must be intended as a cavity the cross sections of which, along its longitudinal axis, have an area variable from a maximum at the feeding or intake end to a minimum at the discharge end, the shape of said sections being circular or limited by different curves radiused to one another.

Similarly the addendum envelope of the screw 5, hereinbefore described as frusto-conical must be intended as a surface the cross sections of which, along its longitudinal axis, have an area decreasing from a maximum at the feeding end to a minimum at the discharge end, the shape of said sections being circular or limited by different curves radiused to one another. In other words, the core of the screw has a circular section and the thread is of a height progressively decreasing from the feeding end towards the outlet end and cyclically variable in sections normal to the axis of rotation of the screw.

Consequently the chambers limited by said curves can pass through one or more positions of minimum height, always radially measured with respect to the screw, and through one or more positions of maximum height, and said positions can be opposite or can be symmetrically or asymmetrically disposed. The only condition to be respected is that the addendum envelope of the screw, during its rotation, must always remain very near, at, at least one point, to the inner surface of the cavity in which the screw rotates.

By way of another non-limiting example, the cavity 4, in planes normal to the axis of rotation of the screw, could be limited by ellipses. Therefore, the screw, limited by circles, would nearly contact the cavity in two positions and two chambers or reservoirs like the chamber 12 would be present between said positions. The cavity 4 could also be limited by equilateral triangles having rounder corners. In this case the screw, still limited by circles, would nearly contact the cavity in three positions and three chambers or reservoirs like the chamber 12 would be present between said positions.

In another case the cavity, in planes normal to the axis of rotation of the screw, could be limited by circles and on the contrary the screw, although having a circular core, could have an addendum envelope constituted by centered or non-centered ellipses, or by equilateral triangles having rounder corners.

Similarly the area of the chamber 12, in the subsequent sections normal to the axis of rotation of the screw, decreases from the feeding end to the outlet end, but the longitudinal section of said chamber, as it appears from FIGURE 1, that is limited by two lines forming a certain angle with respect to each other, must be intended as indicative and not limitative.

In any event, all these different forms of the screw 5 and of the chamber 12, both in planes normal to the axis of rotation of the screw and in longitudinal sections, do not affect the operating principle of the continuous mixer which has been indicated above and fall therefore within the scope of the present invention.

From the description of the working cycle, to which the material passing from the feeding end of the above described continuous mixer to the outlet end of the same is repeatedly subjected, it appears that, although the mixing effect is noticeably strong, the laminating effect is not. In order to increase the effect which is necessary when it is required for instance to incorporate a powdered material into a plastic material or to eliminate the small granules due to a poor dispersion, a particular advantage is obtained by using the mixer illustrated in FIGURES 5 and 6.

In this machine, substantially equal to the one previously described and represented in FIGURES 1 and 2, the thickness of the coils 34, wound about the core 35, is increased extensively with respect to the pitches of the screw. Consequently the material which, after having overflown from the screw 36 into the chamber 37 in the position where the chamber has a maximum height, reenters between the threads of the screw in the position where said chamber has a minimum height, is partially collected between two surfaces, very near to each other and having a remarkable wideness. One of said surfaces; namely, the outer surface of the coils 34, is in rotation and the other; namely, the inner surface of the cavity into which the screw rotates, is stationary and the material is therefore subjected to a very intense laminating action. This action is gradually extended to all the material passing from the feeding end to the outlet end, since said material repeatedly passes from the screw 36 to the chamber 37 and vice versa, and is the more efficient the greater the dimensions of the two nearly contacting surfaces.

By providing a greater thickness of the thread, it is of course necessary to increase also the area of the subsequent sections of the cavity at right angles to the axis of rotation of the screw. In fact the material advancing into said cavity towards the feeding end encounters higher friction on account of the greater outer surface of the coils.

Figure 5:
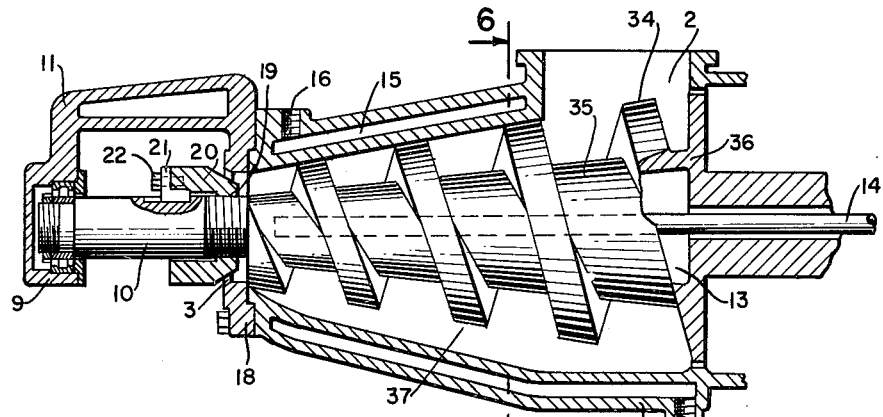
FIGURE 5 is a view like FIGURE 1, taken on the vertical section line of FIGURE 6, and showing a modified form of a "wide thread" feed screw.
Figure 6:
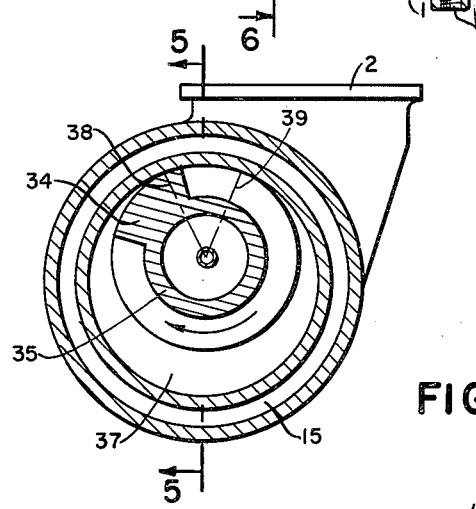
FIGURE 6 is a cross section on line 6—6 of FIGURE 5.

The screw represented in FIGURES 1 and 5 is a single-threaded screw; that is, it is constituted by a single helix wrapped about the central core. However, the screw can be formed by winding about the central core two helices offset 180° with respect to each other or three helices offset 120° with respect to one another, and so on.

In this case the pitch of each helix must be established by taking into account that the single elements of the screw have a width which is two or three times greater than the width they had in the single-threaded screw, but are cut into two or three parts by the helices of the second or of the third thread.

All the above indicated considerations, made in respect of the single-threaded screw, are valid also in respect of the double- or triple-threaded screws. However, it is to be borne in mind that at each turn their capacity will be two or three times that of the single-threaded screw and the conveying action towards the outlet end will be reduced.

Figure 7:
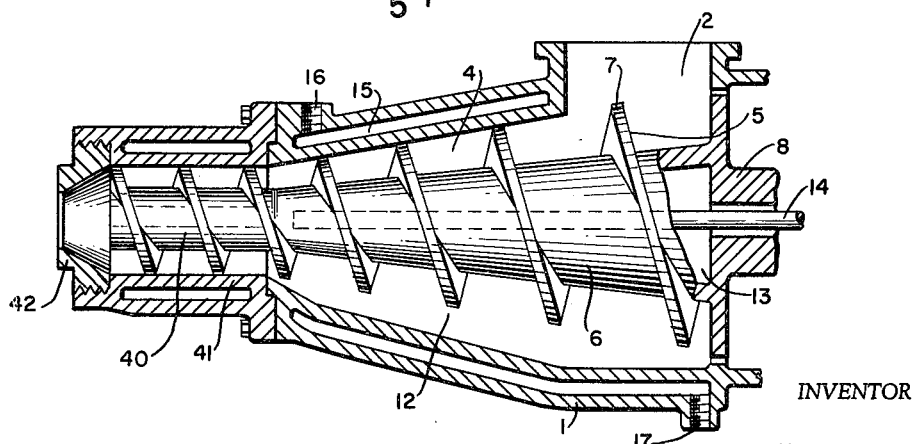
FIGURE 7 is also a central longitudinal section view with parts broken away or other parts appearing in section, the holder for supporting the screw at the discharge end being in the form of a cylindrical extension of the screw itself rotating in a cylindrical extension of the body.

FIGURE 7 represents a third embodiment of the mixer forming the subject matter of the present invention.

In this form the frusto-conical screw extends downstream in the form of a cylindrical screw 40, having a diameter equal to the smaller diameter of the frusto-conical portion, which is contained in a cylindrical extension 41 of the body of the mixer. The length of the cylindrical extension 40 of the screw is such that it can withstand the radial stresses exerted on the screw by the material subjected to the mixing operation.

At the discharge end of the mixer there is an interchangeable die 42, which allows the collection of the mixed material discharging from the machine in the shape of a continuous profile bar. By substituting the die 42 with another die, having an outlet of different size, the ratio between the amount of the discharging material and the amount of material being mixed in the mixer in the same period of time can be varied.

What is claimed is:

1. An apparatus for the continuous treatment of plastic material comprising a receiver having an inlet opening, a discharge opening, and a generally frusto-conical cavity communicating therebetween, the smaller end of said cavity communicating with the discharge opening and the larger end of said cavity communicating with the inlet opening, a frusto-conical feed screw rotatably mounted in said cavity and being substantially coextensive with said cavity, the end of the feed screw of greater diameter being disposed adjacent said inlet opening, the coils of said feed screw extending substantially throughout the length of the core of the feed screw, said coils defining with said screw core at least one helical channel, the cross section of said channel progressively decreasing from the inlet end to the discharge end of said receiver, said feed screw having an addendum envelope which together with the inner surface of said receiver defines a generally annular chamber substantially coextensive with said cavity, said chamber being of a height, measured radially with respect to said screw, varying progressively from a minimum to a maximum and returning to a minimum.

2. The apparatus defined by claim 1 wherein the conicity of the screw is smaller than the corresponding conicity of the cavity throughout at least a portion of the length of said receiver, the respective longitudinal axes of the screw and of the cavity thereby forming an angle which is equal to one-half the angular difference between the two conicities.

3. The apparatus defined by claim 1 wherein said chamber and said helical channel are in completely open communication throughout their respective lengths.

4. The apparatus defined by claim 1 wherein the height of said chamber is minimum at a point on the inner surface of said receiver approximately 180° from the point where the height of said chamber is maximum.

5. The apparatus defined by claim 1 including means carried by the apparatus for varying the size of said discharge opening.

6. The apparatus defined by claim 1 including means carried by said receiver for cutting the material as it is discharged from said receiver.

7. The apparatus defined by claim 1 including a hollow cylindrical housing carried by said receiver at its discharge end and communicating with said frusto-conical cavity, said frusto-conical feed screw having a cylindrical extension at its discharge end coaxially and rotatably mounted in said housing, said extension being of a diameter substantially equal to the diameter of said housing.

8. The apparatus defined by claim 1 wherein the thread of said feed screw is of a thickness greater than that necessary to withstand the stresses imparted to it by the plastic material urged towards the discharge end by the threads.

9. The apparatus defined by claim 1 wherein the positions of minimum height of the chamber limited by the addendum envelope of the screw and by the inner surface of said chamber are aligned according to a generatrix of said cavity.

References Cited by the Examiner

UNITED STATES PATENTS

| 42,926 | 5/64 | Bryant | 24—14 |
|---|---|---|---|
| 1,745,291 | 1/30 | Bleil | 259—9 |
| 1,769,730 | 7/30 | Wetmore. | |
| 2,011,055 | 8/35 | Klugh | 18—12 X |
| 2,224,212 | 12/40 | Bowling | 18—12 X |
| 2,485,854 | 10/49 | Zona | 259—9 |
| 2,505,125 | 4/50 | List | 259—99 |
| 2,556,391 | 6/51 | Hawk | 18—12 X |
| 2,566,854 | 9/51 | Rhodes | 18—12 |
| 2,702,410 | 2/55 | Brown | 18—48 |
| 2,763,896 | 9/56 | Vogt | 18—48 |
| 2,994,105 | 8/61 | Seal et al. | 18—12 X |
| 3,102,717 | 9/63 | Frenkel | 259—7 |

FOREIGN PATENTS

| 598,005 | 5/60 | Canada. |
|---|---|---|
| 1,003,469 | 11/51 | France. |

J. SPENCER OVERHOLSER, *Primary Examiner.*

ALEXANDER H. BRODMERKEL, ROBERT F. WHITE, WILLIAM J. STEPHENSON, *Examiners.*